United States Patent [19]

Demeyer et al.

[11] 4,380,785
[45] Apr. 19, 1983

[54] SOLID STATE TRIP UNIT FOR AN ELECTRICAL CIRCUIT BREAKER

[75] Inventors: Pierre Demeyer, Uriage; Paul Claudin, Grenoble, both of France

[73] Assignee: Merlin Gerin, Grenoble, France

[21] Appl. No.: 244,691

[22] Filed: Mar. 17, 1981

[30] Foreign Application Priority Data

Mar. 31, 1980 [FR] France .................... 80 07284

[51] Int. Cl.³ ................ H02H 3/093; H02H 3/10
[52] U.S. Cl. .................................... 361/96; 361/44;
361/100; 361/101
[58] Field of Search .......... 361/96, 94, 97, 98,
361/100, 42, 44, 48, 101

[56] References Cited

U.S. PATENT DOCUMENTS

| | | | |
|---|---|---|---|
| 3,786,311 | 1/1974 | Hobson, Jr. et al. | 361/44 |
| 3,818,275 | 6/1974 | Shimp | 361/94 |
| 4,004,201 | 1/1977 | DePuy | 361/96 |
| 4,038,695 | 7/1977 | DePuy | 361/42 X |
| 4,060,844 | 11/1977 | Davis et al. | 361/96 |
| 4,068,283 | 1/1978 | Russell | 361/96 X |
| 4,153,924 | 5/1979 | Moran | 361/94 |

FOREIGN PATENT DOCUMENTS

| | | | |
|---|---|---|---|
| 2212666 | 7/1974 | France . | |
| 462937 | 4/1966 | Switzerland . | |
| 1142783 | 2/1969 | United Kingdom | 361/92 |

*Primary Examiner*—Reinhard J. Eisenzopf
*Attorney, Agent, or Firm*—Stevens, Davis, Miller & Mosher

[57] ABSTRACT

The invention concerns a solid state trip unit having long time delay, short time delay and ground fault trip circuits. It comprises a metering resistor (40) electrically connected in a series circuit (42) including additionally a power supply (44) for the trip circuits LR, CR and H, and a trip coil (22). A switch (52) connected in parallel with the coil (22) which may be either in an ON-state to shunt the coil (20), or in an OFF-state after a trip signal is delivered from one of the trip circuits, so as to cause an increase of the impedance of the series circuit (42) and the excitation of the trip coil (22). The trip unit can be applied to low-voltage circuit breakers.

6 Claims, 2 Drawing Figures

SOLID STATE TRIP UNIT FOR AN ELECTRICAL CIRCUIT BREAKER

BACKGROUND OF THE INVENTION

The invention concerns an electronic trip device associated with the control mechanism of a multipole circuit breaker and comprising:

- a detector formed of current transformers and delivering a signal representing the current flowing in the network conductors,
- long time delay, short time delay and/or ground fault electronic trip circuits to generate delayed or instantaneous trip orders according to the magnitude and nature of the fault current,
- and a trip coil energized via a switch, the latter being sensitive to a trip order delivered by any one of the trip circuits, following detection of an overload, short-circuit or differential current.

According to a known device of the prior art, the current transformers supply both the control or data signal and the power for the electronic trip circuits and for the control coil of the trip mechanism. The trip coil is energized by turning on a series-connected thyristor switch. In order to apply the electrical energy to either the control and monitor circuit or the trip coil, additional means are essential.

SUMMARY OF THE INVENTION

The object of the present invention is to provide a simple solid state trip unit ensuring continuity of the monitor circuit power supply while the trip coil is energized.

The solid state trip unit is characterized by the fact that the signal representing the current is applied to a metering resistor electrically connected in a series circuit also including the trip coil and a device for supplying said trip circuits with a stabilized direct voltage. The switch connected in parallel between the terminals of the trip coil may be conducting in the ON-state so as to shunt the coil, wherein the whole current passes through the switch. Alternatively, the switch may be switched in the OFF-state by receipt of a trip signal from one of the long time delay, short time delay and ground fault trip circuits, thus causing an increase in the impedance of the series circuit and energizing of the trip coil.

Said series circuit comprising the metering resistor, the power supply and the trip coil is connected between the output terminals of a current generator formed by a rectifying device fed by the detector current transformers associated with the network phase conductors.

When the switch is in the conducting ON-state, the impedance Z of the series circuit is low, and all the electrical energy made available by the current transformers associated with the network phase conductors R, S and T, is used to supply the control signal and to feed the trip circuits. When a trip order is generated by one of the trip circuits, the switch is switched in the OFF-state and the impedance Z of the series circuit increases, as does the rectified voltage E supplied by the transformers acting as a current generator. The greater part of the electrical energy is used to feed the trip coil, but the power supply to the monitoring electronics is maintained.

The rectified voltage signal at the terminals of the metering resistor is processed and then applied to the long and short time delay trip circuits. The latter, in conjunction with timing devices, deliver either a delayed trip order, the delay being a function of the magnitude of the overload, or an instantaneous trip order in the case of a short-circuit, these orders being applied to an OR gate controlling the switch which is switched in the OFF-state so as to energize the trip coil.

The switch consists of a first transistor, the base of which is connected to the output of the OR control gate, and the collector of which is connected to the base of a second transistor shunting the trip coil.

The outputs of the long time delay, short time delay and ground fault trip circuits are connected to the bases of three control transistors, whose collectors are connected both to the logic circuit of the OR gate and to tripping indicators that determine the nature of the fault.

BRIEF DESCRIPTION OF THE DRAWINGS

Other advantages and characteristics of the invention will stand out more clearly in the following description of an application of the invention, given as a non-restrictive example and shown on the attached drawings, in which.

DESCRIPTION OF THE PREFERRED EMBODIMENT

Figure 1:
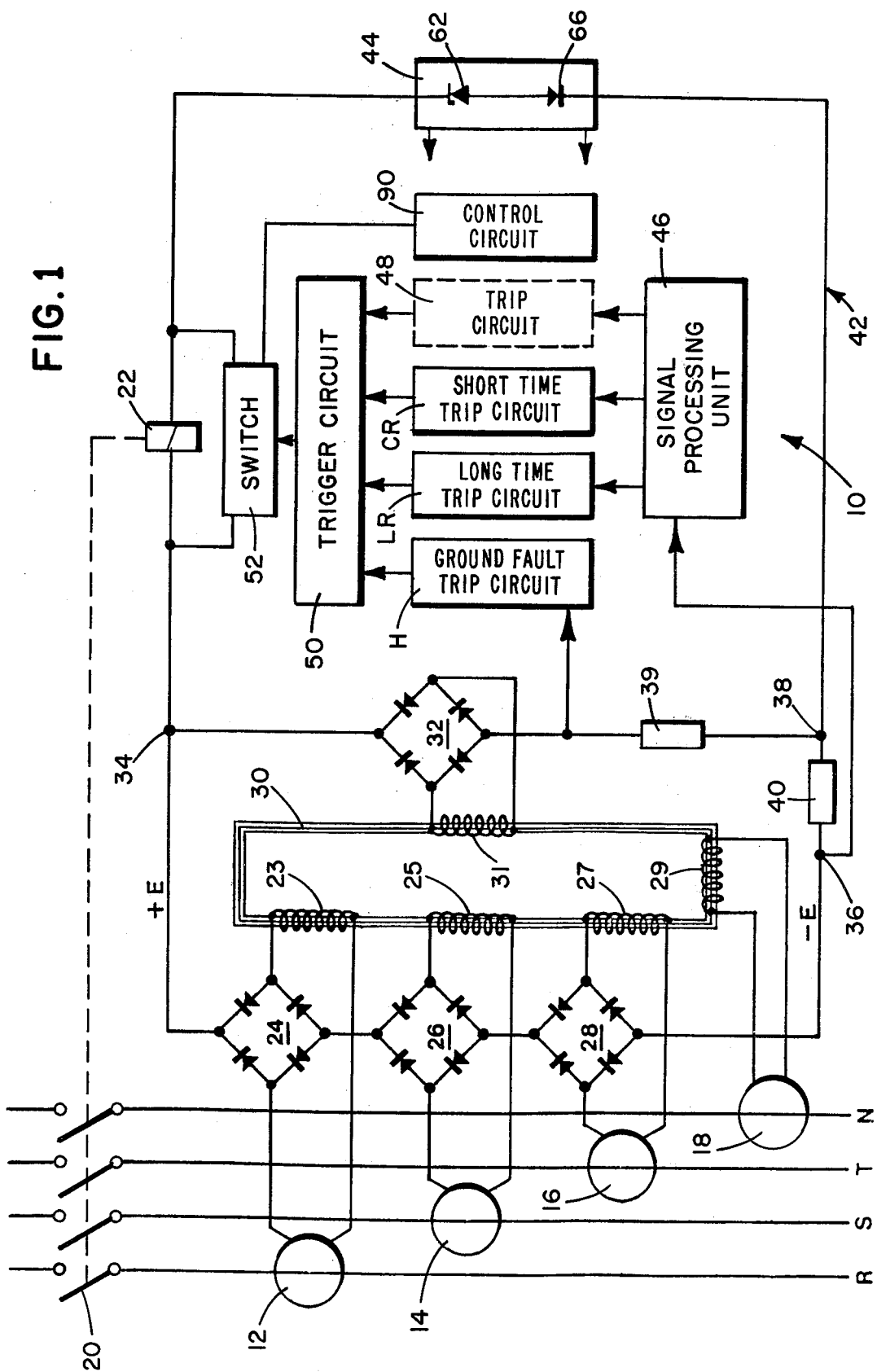
FIG. 1 is a block diagram of the solid state trip unit according to the invention.

On the drawings, the solid state trip unit 10 is controlled by four current sensors, more particularly by current transformers 12, 14, 16, 18, toroidal in form and magnetically coupled to the conductors R, S, T and N of a three-phase-with-neutral network protected by a circuit breaker 20 with trip coil 22. Each secondary winding of the current transformers 12 to 16 associated with the phase conductors R, S and T, drives a diode bridge rectifier 24, 26, 28 and a primary winding 23, 25, 27 of a ferromagnetic earth transformer acting as a differential current sensor. The secondary winding of current transformer 18, associated with the neutral conductor N is connected directly to the primary winding 29 of the earth transformer 30. The secondary winding 31 of the latter sums the currents flowing through the networks and, when a differential fault appears on the network, sends a signal to the full-wave bridge rectifier 32. The outputs of the three bridge rectifiers 24, 26, 28 are connected in series to give a full-wave rectified voltage at the output terminals 34, 36. One of the outputs of the bridge rectifier 32, corresponding to differential transformer 30 is connected to terminal 34 standing at the positive potential of voltage E. The other output of bridge 32 is connected via a zero-sequence resistor 39 to terminal 38 which is at the negative potential of voltage E.

The current transformers 12 to 18 provide the measuring signals of the overload and zero phase sequence currents as well as the supply power for the electronic circuits of the solid state trip unit 10 and the trip coil 22 of the circuit breaker 20.

An overload current metering resistor 40, connected between terminals 36, 38 creates a potential drop proportional to the maximum value of the current flowing through the network conductors R, S, T. The metering resistance 40, or any other means detecting the presence of an overload current has an ohmic resistance of a predetermined or modifiable value in terms of the rated current of the circuit breaker. A series circuit, designated by the general reference 42 is connected to the output terminals 34 and 36 of the bridge rectifiers 24, 26, 28, and has in addition to the metering resistance, a stabilized direct current power source supplying the electronic circuits of the solid state trip unit 10 and the trip coil 22 of the circuit breaker 20. The metering resistance 40, the power supply 44 and the coil 22 are thus electrically connected in series in the circuit 42 fed by the rectified voltage E.

The voltage signal developed at the terminals of the metering resistance 40 is applied to a processing device 46 comprising a conventional peak detector which needs no further description. The signal shaped by the device 46 drives a long time delay trip circuit LR, a short time delay trip circuit CR or any other trip device 48 which delivers a trip signal when the current detected by the current transformers 12, 14, 16 exceeds a threshold or a predetermined function. The trip circuits CR and LR involve in a wellknown configuration operational amplifiers connected as comparators and biased to graded thresholds so as to deliver trip orders in terms of the signal level detected by the resistor 40 leading to either instantaneous tripping on short-circuit or a tripping delayed in terms of the magnitude of the overload. The threshold amplifiers of the trip circuit LR cooperate with a timing device to define an amplitude/delay time function ensuring a stepped $I^2t$ long time tripping curve.

The signal developed at the terminals of the zero sequence resistor 39 is applied to a ground fault trip circuit H which provides a trip order on the appearance of a differential fault detected by the transformer 30. The outputs of the long time delay trip circuit LR, short time delay trip circuit CR and ground fault trip circuit H and trip circuit 48 are connected to an OR gate 50 controlling a solid state switching device 52 connected in parallel at the terminals of the breaker trip coil 22. The bistable switch 52 consists of two transistors 54, 56, the coil 22 being connected between the collector and the emitter of transistor 56, whose base is connected to the collector of the first transistor 54. Switch 52, together with transistors 54 and 56 can be replaced by any other two-state switching element capable of being respectively turned in an ON-state so as to shunt coil 22 as long as a predetermined tripping threshold is not exceeded and turned in an OFF-state so as to energize coil 22 on receipt of a trip signal from one of the trip circuits LR, CR, H or 48 after detection of an overload or differential current by one of the current transformers 24 to 30.

A noise suppression capacitor 58 and a voltage-limiting nonlinear resistance 60 of the varistor type are both connected in parallel with trip coil 22. The voltage developed at the terminals of coil 22 in the OFF-state of switch 52 is thus limited when an overcurrent appears in the series circuit 42.

The direct voltage supply device 44 of the electronic trip circuits includes a Zener diode 62 whose cathode is connected to the junction 64 of the emitter of transistor 56 and one of the terminals of coil 22. The anode of Zener diode 62 is connected to the anode of diode 66, the cathode of which is joined to terminal 38 of the series circuit 42. The voltage available at the intermediate point 68 of the junction of the anodes of diodes 62, 66 acts as the voltage reference and the positive and negative polarities of the direct supply voltage delivered by device 44 are situated respectively at the cathodes of the same diodes 62, 66. The output of the long time delay LR, short time delay CR and ground fault H trip circuits, are connected respectively to the bases of three control transistors 70, 72, 74, the collectors of which are connected on the one hand to the inputs of the OR logic circuit 50 and on the other hand to the trip indicators 76, 78, 80 capable of determining the nature of the trip order upon conduction by one of the transistor 70 to 74 whose emitters are all connected to the reference potential of point 68. A Zener diode 82, connected between terminal 34 and the trip indicators 76, 78, 80 ensures signalling control when the voltage at the terminals of trip coil 22 is sufficient. Each trip indicator 76 to 80 is shunted by a diode 84, 86, 88, whose cathode is joined to the anode of Zener diode 82.

To avoid inadvertent tripping of the circuit breaker 20 when power is applied, an auxiliary control device 90 gives rise to an initial turn-on of switch 52 with transistors 54, 56 to ensure trip coil 22 to be shunted as soon as current arrives in the current transformers 12 to 18.

Figure 2:
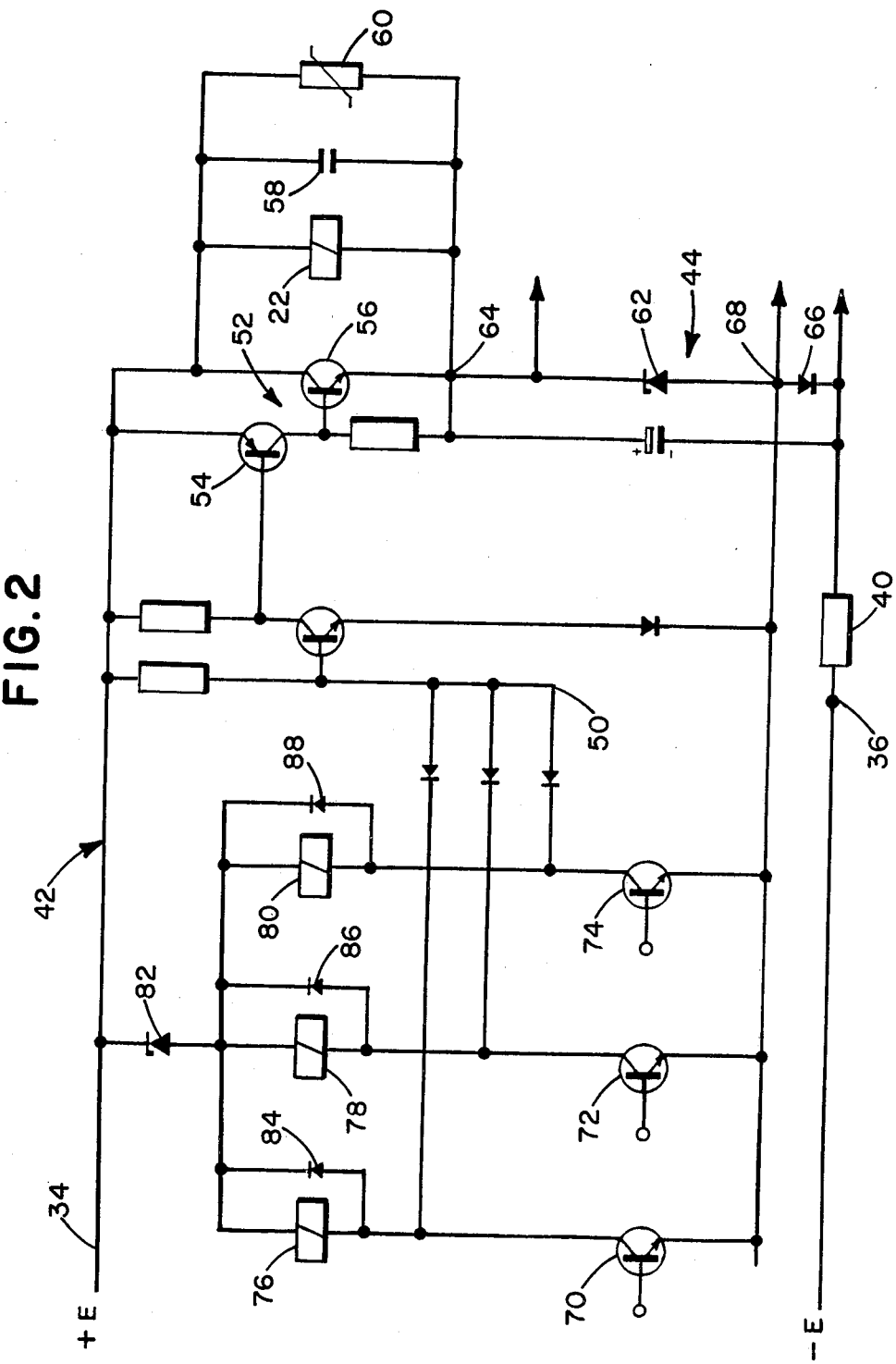
FIG. 2 is a detailed diagram of one part of the trip unit shown in FIG. 1.

The operation of the solid state trip unit as shown in FIGS. 1 and 2, is as follows:

In the absence of a differential fault, or an overload current beyond a predetermined threshold, switch 52 is normally in the ON-state so as to shunt trip coil 22 of breaker 20 whose contacts are closed. The impedance Z of series circuit 42 is low and depends solely on the value of resistor 40 and the impedance of the diodes 62, 66. The electronic trip circuits LR, CR and H are fed by the direct voltage device 44 of series circuit 42, and the control voltage at terminals of the zero sequence resistor 39 and the metering resistor 40 is insufficient to generate any trip order towards the base of transistor 54. The shunting of coil 22 sends all the current through switch 52, and it can be seen that all the electrical energy supplied by the three transformers 12 to 16 from lines R, S, T is used to furnish a metering or data signal to the trip circuits and energy to power supply 44.

When a differential current on the network is detected by transformer 30, the zero sequence voltage signal of resistor 39 is applied to the ground fault trip circuit H which sends a differential trip order to the OR gate 50. The action is the same in the case of an overload or short-circuit current which leads to the generation of a delayed or instantaneous trip signal by one of the trip circuits LR or CR controlled by the voltage across the metering resistance 40. Any one of these orders ensures that transistor 56 of switch 52 is turned off, leading to the immediate energizing of trip coil 22 followed by the opening of the contacts of breaker 20. The nature of the fault is simultaneously shown by one of the trip indicators 76, 78, 80. The metering voltage across resistors 39 and 40 and the power supply 44 to the electronic trip and monitor currents are maintained during the tripping phase preceding the opening of the breaker. In the OFF-state of switch 52, the impedance Z of series circuit 42 increases, leading to an increase in the rectified voltage E. The greater part of the electrical energy supplied by the bridge rectifiers of the current generator is therefore used to feed the trip coil 22.

What is claimed is:

1. An electronic trip device for initiating automatic tripping of an electric circuit breaker in response to an abnormal circuit condition in a protected electrical distribution circuit comprising:

a detector including current transformers, said detector operating to deliver a current signal having a predetermined relationship to the current flowing in said distribution circuit;

a series circuit connected to said detector and including a metering resistor for generating a voltage signal proportional to said current signal, a trip coil for initiating said automatic tripping when it is energized, and means forming a power supply, said metering resistor, trip coil and power supply means being electrically connected in series;

electronic trip circuits responsive to said voltage signal for generating a tripping signal in response to said abnormal circuit conditions, said electronic trip circuits being powered by said power supply means;

a shunt circuit electrically connected in parallel to said trip coil and including a switch responsive to said tripping signal and being either in an ON-state to shunt the trip coil or in an OFF-state after the generation of said tripping signal for energization of said trip coil.

2. The electronic trip device of claim 1, wherein said detector comprises first current rectifying means for rectifying the current generated by said current transformers and flowing in said series circuit.

3. The electronic trip device of claim 2 further comprising first and second circuit means for conducting current to and from said current transformers respectively, differential transformer means for monitoring currents sensed by said current transformers, second current rectifying means for rectifying the current generated by said differential transformer means, means forming a resistance and a ground fault electronic trip circuit, said differential transformer means including a plurality of primary windings and a secondary winding, each of said first circuit means operating to electrically interconnect a respective one of said current transformers to a respective one of said primary windings, said second current means operating to electrically interconnect said secondary winding, said resistance means and said ground fault electronic trip circuit, said secondary winding operating to sum the currents through said primary windings and to cause a current to flow through said second current rectifying means and said resistance means, said ground fault electronic trip circuit being responsive to the voltage developed across said resistance means.

4. The electronic trip device of claim 1, wherein said power supply means includes a Zener diode and a diode in series, the anode of the Zener diode being connected to the anode of the diode.

5. The electronic trip device of claim 4, further comprising a ground fault electronic trip circuit electrically connected to said current transformers for generating a tripping signal in response to a ground fault in said distribution circuit.

6. The electronic trip device of claim 1, wherein said electronic trip circuits comprise a long time delay trip circuit and a short time delay trip circuit for generating respectively delayed and instantaneous tripping signals according to the magnitude of the current flowing in said distribution circuit.

* * * * *